(12) United States Patent
Elgressy et al.

(10) Patent No.: US 11,671,461 B1
(45) Date of Patent: *Jun. 6, 2023

(54) APPARATUS AND METHODS THEREOF FOR INSPECTING EVENTS IN A COMPUTERIZED ENVIRONMENT RESPECTIVE OF A UNIFIED INDEX FOR GRANULAR ACCESS CONTROL

(71) Applicant: PROOFPOINT ISRAEL LTD, Hertzeliya (IL)

(72) Inventors: Doron Elgressy, Hertzeliya (IL); Yair Grindlinger, Hertzeliya (IL); Boris Gorin, Hertzeliya (IL)

(73) Assignee: PROOFPOINT ISRAEL LTD, Hertzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,535

(22) Filed: Sep. 16, 2022

Related U.S. Application Data

(63) Continuation of application No. 16/746,521, filed on Jan. 17, 2020, now Pat. No. 11,489,850, which is a continuation of application No. 15/285,858, filed on Oct. 5, 2016, now Pat. No. 10,581,876.

(60) Provisional application No. 62/370,757, filed on Aug. 4, 2016.

(51) Int. Cl.
*H04L 9/40* (2022.01)

(52) U.S. Cl.
CPC .................................. *H04L 63/20* (2013.01)

(58) Field of Classification Search
CPC ........................................................ H04L 63/20
See application file for complete search history.

(56) References Cited

U.S. PATENT DOCUMENTS

| | | | |
|---|---|---|---|
| 2011/0295857 A1* | 12/2011 | Aw ........................ | G06F 40/45 707/739 |
| 2015/0163121 A1* | 6/2015 | Mahaffey ............... | H04W 12/12 707/687 |
| 2016/0219060 A1* | 7/2016 | Karunakaran ........ | H04L 63/102 |

* cited by examiner

*Primary Examiner* — Ayoub Alata
(74) *Attorney, Agent, or Firm* — Sprinkle IP Law Group

(57) ABSTRACT

An apparatus collects data from a data network for the purpose of detection and interception of security incidents therein. The apparatus identifies at least one event in the data network. The apparatus then inspects the event to identify its properties and metadata associated therewith. Based on the inspection, the apparatus identifies at least a type of the event, an operation and a resource associated with the event, and a device associated with the event. The metadata is the matched to a unified index stored in a database communicatively coupled to the apparatus via a network. Based on the match the apparatus determines whether the event is potentially a security incident. In case a determination of a potential security incident is made, the apparatus queries a set of set of policy rules to determine a type of action required respective of the metadata. The apparatus then performs the required action.

20 Claims, 5 Drawing Sheets

APPARATUS AND METHODS THEREOF FOR INSPECTING EVENTS IN A COMPUTERIZED ENVIRONMENT RESPECTIVE OF A UNIFIED INDEX FOR GRANULAR ACCESS CONTROL

CROSS-REFERENCE TO RELATED APPLICATIONS

This application is a continuation of, and claims a benefit of priority under 35 U.S.C. § 120 from, U.S. patent application Ser. No. 16/746,521, filed Jan. 17, 2020, entitled "APPARATUS AND METHODS THEREOF FOR INSPECTING EVENTS IN A COMPUTERIZED ENVIRONMENT RESPECTIVE OF A UNIFIED INDEX FOR GRANULAR ACCESS CONTROL," now U.S. Pat. No. 11,489,850, which is a continuation of, and claims a benefit of priority under 35 U.S.C. § 120 from, U.S. patent application Ser. No. 15/285,858, filed Oct. 5, 2016, entitled "APPARATUS AND METHODS THEREOF FOR INSPECTING EVENTS IN A COMPUTERIZED ENVIRONMENT RESPECTIVE OF A UNIFIED INDEX FOR GRANULAR ACCESS CONTROL," now U.S. Pat. No. 10,581,876, which claims a benefit of priority under 35 U.S.C. § 119(e) from U.S. Provisional Application No. 62/370,757, filed on Aug. 4, 2016, entitled "APPARATUS AND METHODS THEREOF FOR INSPECTING EVENTS IN A COMPUTERIZED ENVIRONMENT RESPECTIVE OF A UNIFIED INDEX FOR GRANULAR ACCESS CONTROL," all of which are hereby incorporated by reference in their entireties.

BACKGROUND

The disclosure generally relates to data security, and more specifically, to techniques for detection and prevention of security incidents on a computerized environment.

Nowadays, as organizations and enterprises increase in size, they are increasingly more susceptible to malicious attacks. In order to identify such attacks, a number of different anti-virus applications are currently available. These applications must be deployed into a computerized environment and are supposed to terminate malicious activity within the network. These applications are typically used for managing the data and communication.

Other solutions known in related art only provide threat detection and do not provide any mitigation process. The majority of these solutions rely upon a basic engine that searches suspect files for the presence of predetermined virus signatures.

Firewall is a network security system solution that monitors and controls the incoming and outgoing network traffic based on predetermined security rules. A firewall typically establishes a barrier between a trusted, secure internal network and another outside network, such as the Internet, that is assumed not to be secure or trusted. Firewalls are often categorized as either network firewalls or host-based firewalls. Network firewalls are a software appliance running on general purpose hardware or hardware-based firewall computer appliances that filter traffic between two or more networks. Host-based firewalls provide a layer of software on one host that controls network traffic in and out of that single machine.

However, firewalls cannot inspect an application and do not have deep applications awareness. Therefore, firewall solutions are typically capable of identifying only certain activities such as file downloads and uploads and this provides a limitation on such solutions. Therefore, further forensics, and attribute level awareness, i.e. the files permissions, owner, content and classification, are typically beyond the capabilities of firewall-like solutions. Furthermore, firewalls and other network based solution such as Web Proxies, Access and Entitlement Management, etc., would require customized configuration and/or adaptor developments and integration in order to comprehend individual application(s) activities and resources.

It would be therefore advantageous to provide a solution that overcomes some of the deficiencies of the related art by enabling the inspection and interception of all events in a network for providing granular access control, threat protection and forensics without requiring complex and customized pre-configuration.

SUMMARY OF THE INVENTION

To realize some of the advantages discussed above, there is provided an apparatus for events inspection in a computerized network environment respective of a unified index. The apparatus comprises an interface to a data communication network, a processing unit and a memory coupled to the processing unit, the memory contains therein instructions that when executed on the processing unit, configures the apparatus. The apparatus is configured to identify at least one event in the data communication network and do further processing as discussed herein. The at least one event is analyzed to generate metadata associated therewith. The metadata is at least: a type of the at least one event, an operation, a resource associated with the at least one event, a user, or a device associated with the at least one event. The metadata is matched to a unified index stored in a database communicatively coupled to the apparatus via the interface to determine whether the at least one event matches a predefined policy. It is determined whether the at least one event is potentially a security incident respective of the match.

In an enhancement the memory further contains therein instructions that when executed on the processing unit, configures the apparatus to query an interception policy administration to determine a type of interception required upon determination that the at least one event is potentially a security incident respective of the metadata.

In another enhancement the interception type is at least one of: providing a notification, terminating the event, storing the metadata associated with the request in the data warehouse, a combination thereof, a portion thereof.

In yet another enhancement, the interception administration policy is stored in the database.

In yet another enhancement, the event is at least one of: a file download/upload, removal of a file, termination/execution of a process, view of a file, a communication request, a combination thereof.

In yet another enhancement, the interface further enables interaction with one or more web sources.

In still another enhancement, the identification of the events is achieved at least in conjunction with at least an application programming interface (API) coupled to a web source communicatively coupled to the data network.

In still another enhancement, the memory further contains therein instructions that when executed by the processing unit configures the apparatus to generate an identifier respective of the at least one event, wherein the identifier comprises a numeric injective value representative of the at least one event. The generated identifier is stored in a database in association with the at least one event.

In a specific enhancement, the memory further contains therein instructions that when executed by the processing unit configures the apparatus to determine whether the at least one event was previously handled by the apparatus respective by querying the identifiers stored in the database.

Another aspect of the disclosed teachings is a method for inspecting events in a computerized network environment respective of a unified index. The method comprised identifying at least one event in the data communication network. The at least one event is analyzed to generate metadata associated therewith, wherein the metadata is at least: a type of the at least one event, an operation, a resource associated with the at least one event, a user, a device associated with the at least one event. The metadata is matched to a unified index stored in a database communicatively coupled to the apparatus via the interface to determine whether the at least one event matches a predefined policy. It is determined whether the at least one event is potentially a security incident respective of the match.

Yet other aspects of the disclosed teachings include computer software products embedded in a non-transient computer-readable medium containing instructions that when executed on the computer perform the methods discussed above.

BRIEF DESCRIPTION OF THE DRAWINGS

The subject matter that is regarded as the disclosure is particularly pointed out and distinctly claimed in the claims at the conclusion of the specification. The foregoing and other objects, features, and advantages of the disclosure will be apparent from the following detailed description taken in conjunction with the accompanying drawings.

DETAILED DESCRIPTION OF THE INVENTION

Figure 1:
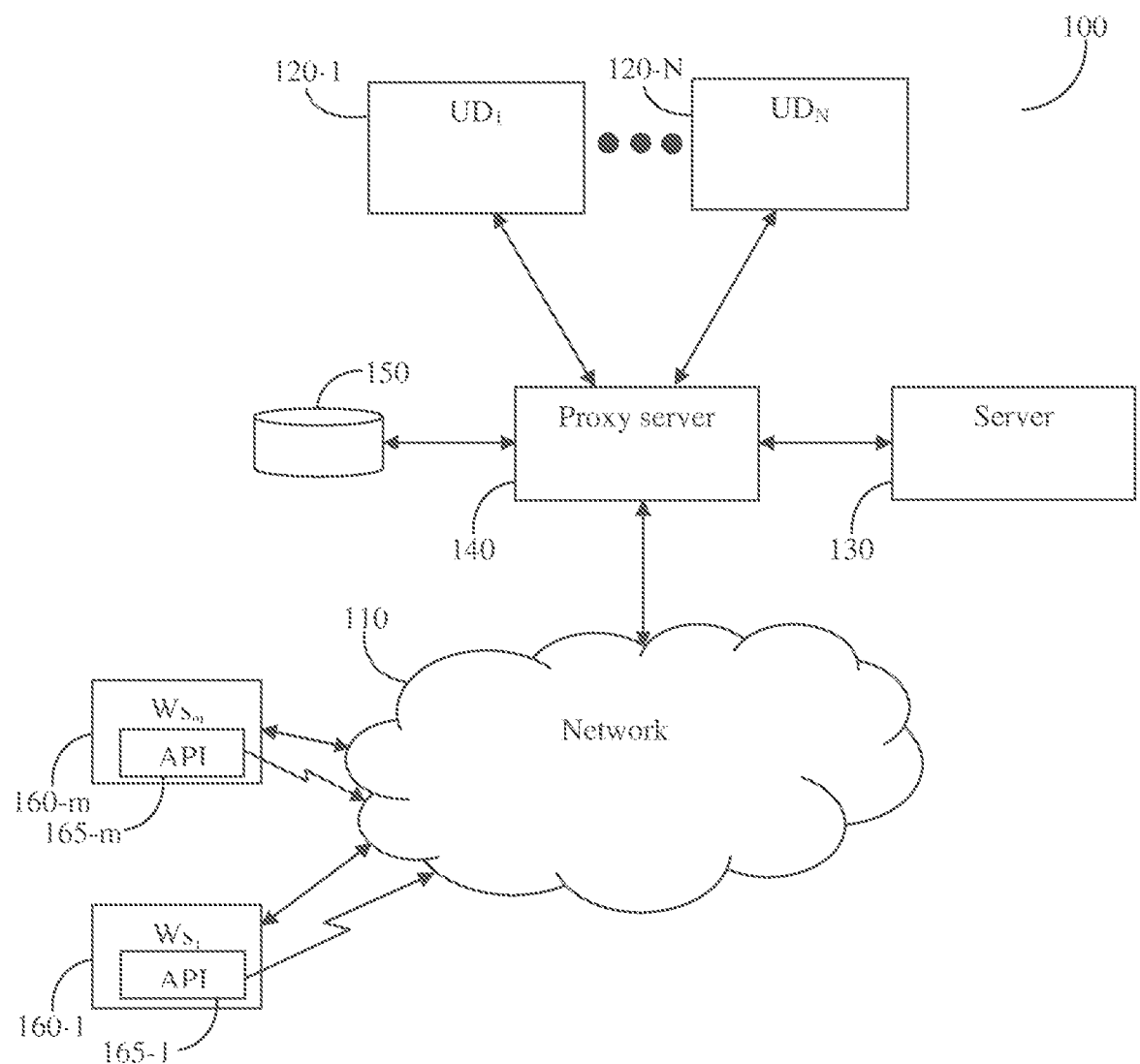
FIG. 1 is an exemplary system for communication between a plurality of user devices and a plurality of data sources.

The embodiments disclosed herein are only examples of the many possible advantageous uses and implementations of the innovative teachings presented herein. In general, statements made in the specification of the present application do not necessarily limit any of the various claimed embodiments of the disclosure. Moreover, some statements may apply to some inventive features but not to others. In general, unless otherwise indicated, singular elements may be in plural and vice versa with no loss of generality. In the drawings, like numerals refer to like parts through several views.

An apparatus collects data from a data network for the purpose of detection and interception of security events therein. It should be clear that interception may be made for the purpose of examination and/or capturing, e.g., stopping traffic route from a first point to at least a second point. The apparatus identifies at least one event in the data network. The apparatus then inspects the event to identify metadata associated therewith. Based on the inspection, the apparatus identifies at least a type of the event, an operation and a resource associated with the event, and a device associated with the event. The metadata is then matched to a unified index stored in a database communicatively coupled to the apparatus via a network. Based on the match the apparatus determines a policies' matching rank based on its metadata. The policies' matching rank may further include a cumulative risk score determined for the event. In case a determination is made that the event is potentially a security incident, the apparatus queries a set of policy rules to determine a type of action required based on the metadata and the events properties. The apparatus then performs the required action. The policy rules may be structured and deterministic or alternatively, fuzzy, e.g., general guidelines.

The embodiments disclosed herein depict a uniform and generic computer-readable terminology for classifying and indexing events in a computerized environment. It should be clear for one of ordinary skill in the art that the characterization of a variety of events performed by users in a variety of applications in a scalable manner, required such unitary index. It should be further clear that the embodiments disclosed herein enable accurate identification of web traffic for the purpose of access control, threat protection and compliance and more.

FIG. 1 depicts an exemplary and non-limiting system 100 operative in accordance with an embodiment of the disclosed teachings. A network 110 is a network that enables communication between one or more user devices 120-1 through 120-N where 'N' is integer equal to or great than '1'. The network may be wireless, cellular or wired, a local area network (LAN), a wide area network (WAN), a metro area network (MAN), the Internet, the worldwide web (WWW), like networks, and any combination thereof. The user devices 120 can be, but are not limited to, smartphones, tablet computers, netbook computers, laptop computers, personal computers, wearable computing devices as well as other computing devices that are capable of running in a multi-tasking mode.

That is, a plurality of applications may be executing seemingly in parallel in accordance with known principles of multi-tasking operation. Examples for such devices may include Apple's iPhone®, Samsung's tablet computers as well as Google's Android® smartphones, tablet computers, PCs, etc. The user devices 120 communicate wirelessly with the network 110 among others for the purpose of communication with a server 130 as well as a plurality of web sources. The web sources may include, for example, webpages, application servers, data sources, etc. that are accessible by the user devices 120 via the network 110.

The server 130 and the user devices 120 are associated with an entity's network such as, for example, an organization, an enterprise, etc., where the user devices are typically operated by users associated with the entity, e.g., employees and the server 130 is operated by an administrator associated with the entity. The server 130 may be an e-mail server, web server, databases, a combination thereof and many other servers capable of receiving and/or providing data to and from the user devices 120. The system 100 may further include one or more web sources (not shown) such as, for example, private web sources, e.g., associated with the entity, public web sources, etc.

The system 100 further comprises a database 150. The database 150 is configured to store therein at least a unitary index for classifying and organizing events identified in the network 110. According to an embodiment, the database 150 is further configured to store a set of policy rules of how to handle security incidents. Such policy rules may be preconfigured by the server 130. According to an embodiment, the proxy server 140 may provide one or more recommendations on how to handle security event, as further described herein below.

According to an embodiment, the proxy server 140 is configured to at least identify events in the network 110, e.g., requests sent and received from and to the user devices 120. Events are notable occurrence at a particular point in time that typically starts with a request sent from a user device 120. The events may include, for example, an authorization sent from a user device 120, a file download/upload, removal of a file, termination/execution of a process, view of a file, a communication request, a combination thereof, etc.

According to an embodiment, the identification is performed by the proxy server 140. According to another embodiment, the proxy server 140 may further be coupled to one or more web sources 160-1 through 160-$m$ via the network 110. To that end, the proxy server may interface with an application programming interface (API) 165-1 through 165-$m$ of the corresponding one or more web sources 160 by which the proxy server 140 can further identify events in the network 110 therewith.

The proxy server 140 then analyzes the event to generate metadata associated therewith. The generation of the metadata may be achieved based on a content of an event, header(s) associated therewith, metatags, etc. The metadata may include, for example, a type of the at least one event, a resource associated with the at least one event, a device associated with the at least one event, a time pointer indicative of the at least one event, a combination thereof, etc.

The metadata may then be sent for storage in the database 150 in association with the respective event. According to another embodiment, an identifier may be generated by the proxy server 140 to the at least one event based on the metadata. According to an embodiment, the identifier may be a numeric injective value representative of the at least one event. The identifier enables prevention of duplication of events in the database 150. As events may be identified using different techniques and/or different sources, the proxy server 140, etc. the prevention of events' duplication is necessary to enhance the operation of the system 100 for example, security applications, integrity check performance, etc.

The proxy server 140 then matches the metadata to the unified index stored in the database 150. The unified index enables generic and unified classification of events occurring in the network 110 regardless of the source through which they were made. According to an embodiment, the unified index may be corresponding to extensible access control markup language (XACML) standard. The XACML standard defines a declarative fine-grained, attribute-based access control policy language, and a processing model describing how to evaluate access requests according to the rules defined in policies.

The unified index enables naming of all objects in an event using a unitary language. As a non-limiting example, the naming may include parsing of an event to at least three portions: subject, i.e., the entity that initiated the request, which is typically a user or a plurality of user devices from among the user devices 120. Another portion is the operation, i.e., the activity requested, and another portion is the resource for the operation, i.e., file, document, that is, the object associated with the event.

Based on the match, the proxy server 140 is configured to at least determine whether the event is potentially a security incident. A security incident, as identified by the server 130, may include, for example, data leakage, unauthorized request sent from a user device 120, malicious software program (Malware) download, a targeted threat on one or more user devices 120, unauthorized access to a resource a combination thereof, etc. Malware may be a Resware, an Adware, a Spamware, a virus, a Botnet, a Spyware, a Trojan, a Crimeware, an advanced persistent threat (APT), and so on. These examples of a security incident are provided by way of an example and not by way of a limitation. Furthermore, security incidents may be distinctively preconfigured by the server 130 with respect of the entity's policy.

According to an embodiment, upon determination that the at least one event is potentially a security incident corresponding to the metadata, the proxy server 140 queries an interception policy administration to determine a type of interception required. The interception policy administration may be stored as a set of rules in the database 150. According to another embodiment, a request for a specific interception policy administration may be sent in real-time to the server 130 upon identification of a potential security incident. Data corresponding to the event and/or the interception is then sent to the database 150 for storage.

According to a further embodiment, based on the match, the proxy server 140 is configured to make authorization decisions corresponding to the at least one event. The authorization decisions may include, for example, to grant access to an action associated with the at least one event, deny access, or grant access under one or more conditions, etc.

As a non-limiting example, the proxy server 140 identifies a request to download a file from a web source sent from a user device, for example, the user device 120-1. The request may be identified by the proxy server 140 in conjunction with at least one application programming interface coupled to at least one web source. The proxy server 140 then analyzes the request and generates metadata associated therewith. The analysis may include querying of a header of the file requested, time pointer associated with the request, a type of the user device 120-1, a user associated with the user device 120-1, the source to which the request was sent, etc. The generated metadata is then matched by the proxy server 140 to the unified index stored in the database 150. Based on the match, the proxy server 140 enables determination of whether the request is potentially a security incident. Upon determination that the request is potentially a security incident respective of the metadata, the proxy server 140 queries a policy administration point to determine a type of action required upon determination. According to a further embodiment, the proxy server 140 further enables access control as further described hereinabove by querying the policy administration point. The access control determination may be, for example, to grant access, deny access, grant access under one or more certain conditions of a step-up authentication, etc. The policy may be extracted from the database 150. The type of interception may be to provide a notification to the user device 120-1, provide a notification to the server 130, terminate the request, store the metadata associated with the request in the database 150 and more. According to a further embodiment, the proxy server 140 generates an identifier corresponding to the request so that the request shall have a unitary representation in the database 150 and therefore will not be examined again. The proxy server 140 then operates according to the interception policy.

Figure 2:
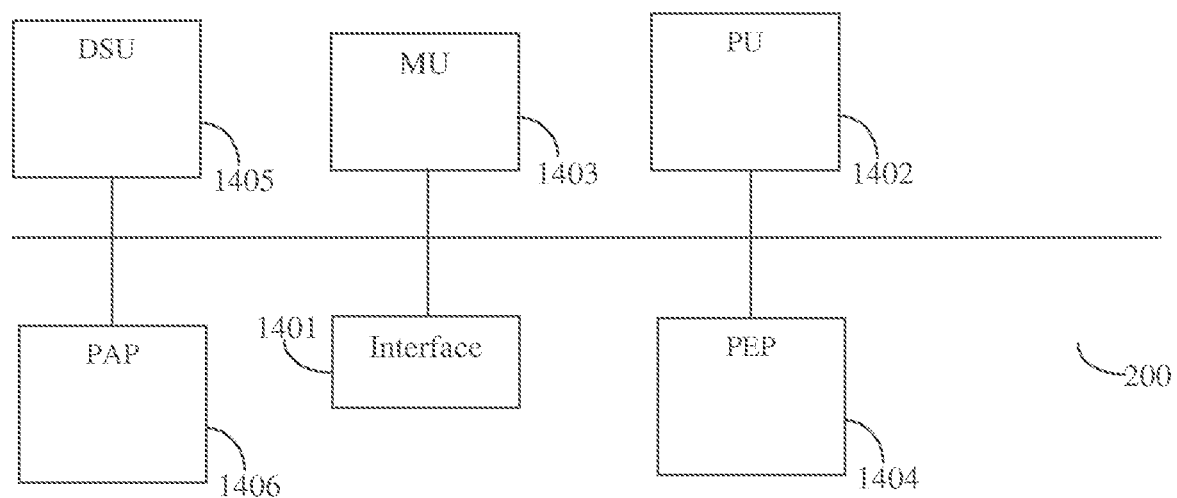
FIG. 2 is a schematic diagram of the proxy server for interrogating events in a data network according to an exemplary embodiment.

FIG. 2 depicts an exemplary and non-limiting embodiment 200 of a proxy server for events inspection in a data network according to an embodiment. According to an embodiment, the proxy server is configured to at least identify events that occurred in a network associated with an entity, e.g., an enterprise network, examine the events identified and if necessary, intercept events that are/were classified as potential security incidents corresponding to a predetermined set of rules and a unitary index.

The proxy server comprises an interface 1401 to a network such as, for example, the network 110. The interface 1401 enables the proxy server to identify events that occur in the network. The interface may be coupled via the network to a server associated with the entity, one or more user devices. According to an embodiment, the interface 1401 further enables interaction with one or more web sources over the network and/or application programming interfaces (APIs) associated therewith.

The proxy server further comprises a processing unit (PU), such as a processor 1402 and a memory unit (MU) 1403. The MU 1403 contains therein instructions that when executed by the PU 1402 configures the proxy server as further described herein below.

The proxy server further comprises a policy enforcement point (PEP) 1404. The PEP 1404 comprising a set of rules that when executed by the PU 1402 configures the proxy server to handle identified potential security incident based on the set of rules.

The proxy server further comprises a data storage unit (DSU) 1405. The DSU 1405 contains therein at least a unitary index for classification and organization of a plurality of events occurred in the enterprise's network.

The proxy server further comprises a (PAP) 1406. The PAP 1406 is an interface to, for example, a server, such as the server 130 that enables the receipt of rules on how to handle security incidents. The rules are thereafter stored in the PEP 1404.

Figure 3:
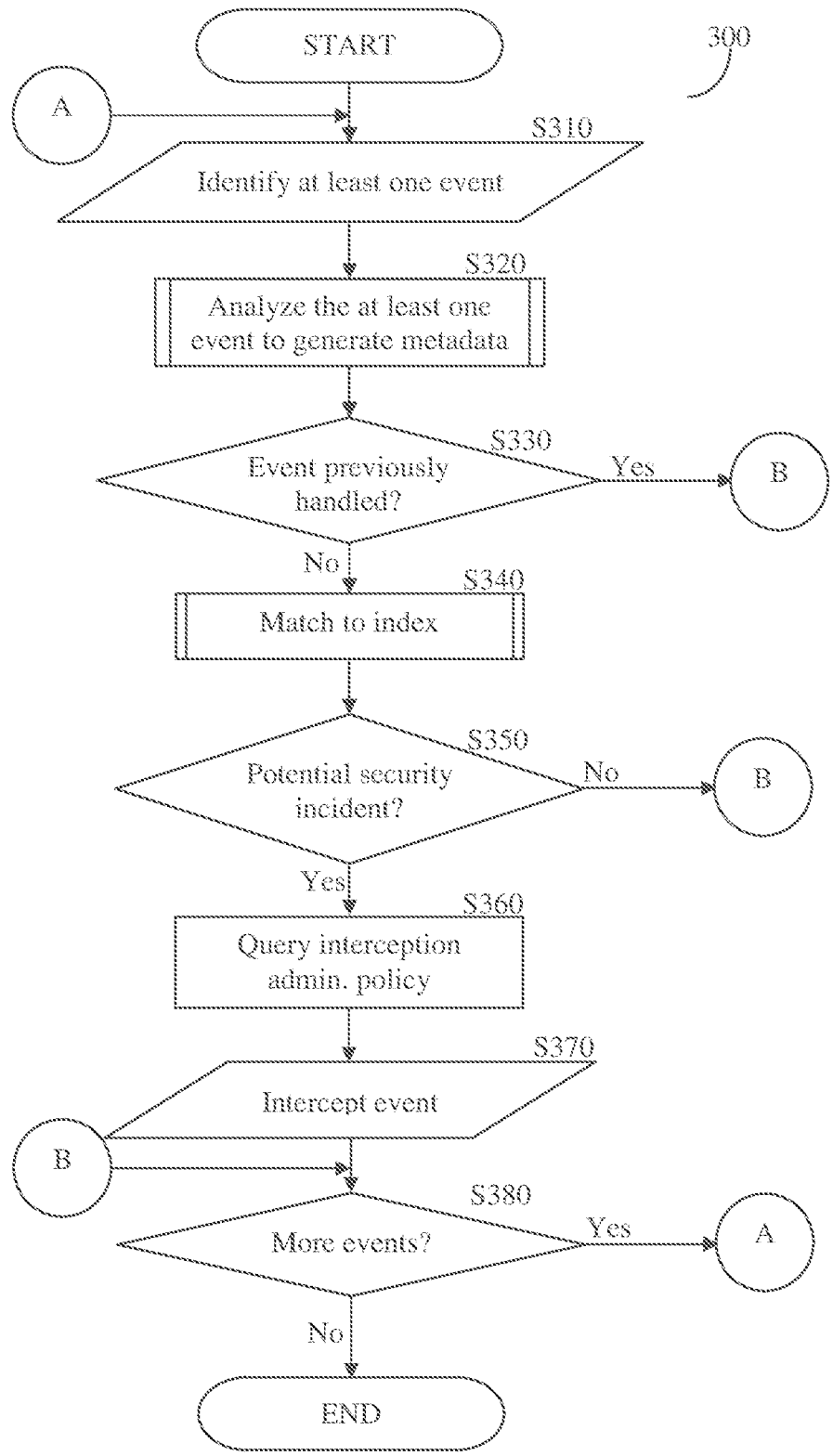
FIG. 3 is a flowchart describing an operation of a method for examining events in a data network according to an exemplary embodiment.

FIG. 3 is an exemplary and non-limiting flowchart describing an operation of a method for interrogating events in a data network according to an embodiment. In S310, the operation starts when at least one event is identified in the data network.

According to an embodiment, the event is identified by the proxy server 140 in conjunction with the server 130. The event may be, for example, a request sent by a user device 120 or to a user device 120, a file download, a file view, an attempt to connect to a certain network or log on to a certain service, a combination thereof, etc.

In S320, the at least one event is analyzed by the proxy server 140. Based on the analysis, metadata associated with the at least one event is generated by the proxy server 140. The metadata may include, for example, a type of the at least one event, an operation and a resource associated with the at least one event, and a device associated with the at least one event, a combination thereof, and more. The operation of analysis, the at least one event and generation of metadata respective thereof performed by the proxy server 140 is further described herein below with respect of FIG. 4.

In optional S330, it is checked whether the event was previously handled and if so, execution continues with S380; otherwise, execution continues with S340. The check whether the event was previously handled is performed by the proxy server 140 respective of the metadata, wherein a search is performed by the proxy server 140 through the database 150 for same metadata or an identifier generated respective thereof.

In S340, the metadata is matched to a unitary index stored in the database 150. In S350, it is checked whether the event is potentially a security incident and if so, execution continues with S360; otherwise, execution continues with S380.

In S360, an interception administration policy stored in, for example, the database 150 is queried by the proxy server 140 respective of the potential security incident and/or the metadata associated therewith. The interception administration policy is to instruct the proxy server 140 as to how to handle the at least one event that is determined as a potential security incident.

In S370, the at least one event is intercepted by the proxy server 140 respective of the interception administration policy. In S380, it is checked whether additional events were identified and if so, execution continues with S310; otherwise, execution terminates.

Figure 4:
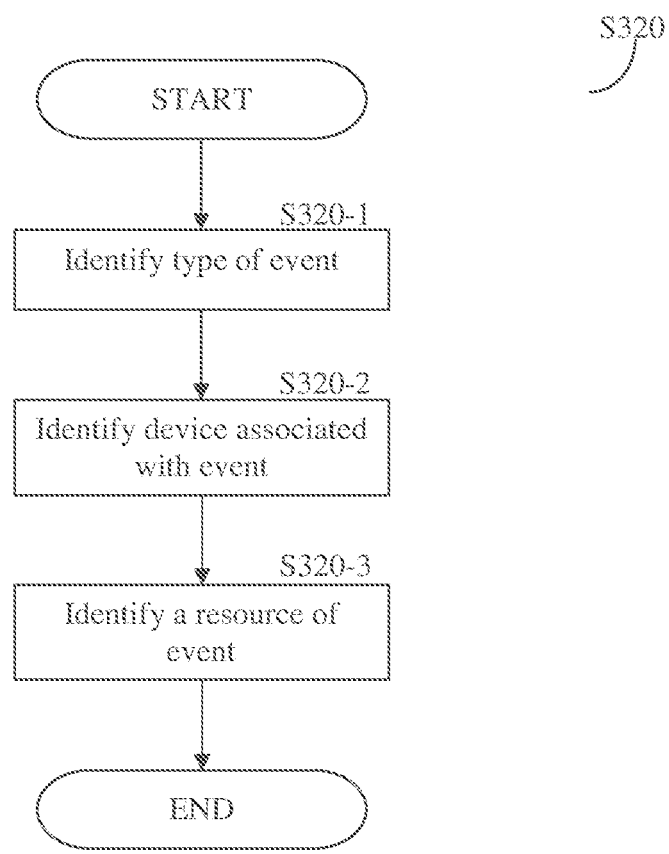
FIG. 4 is a flowchart describing the operation of generating metadata respective of an event according to an exemplary embodiment.

FIG. 4 shows an exemplary and non-limiting flowchart 320 describing the operation of generating metadata respective of an event according to an embodiment. In S320-1, the operation starts when a type of the at least one event is identified by the proxy server 140. The type of the event may be, for example, a local request, a request sent to the server 130, a request sent to a web source over the network 110, an outgoing communication, etc. In S320-2, a device associated with the request is identified, i.e., type of the device, a user associated with the device, etc.

In S320-3, a resource associated with the at least one event is identified, i.e., a web-page, a server to which the request was sent, a link to a file requested, etc. and execution terminates.

Figure 5:
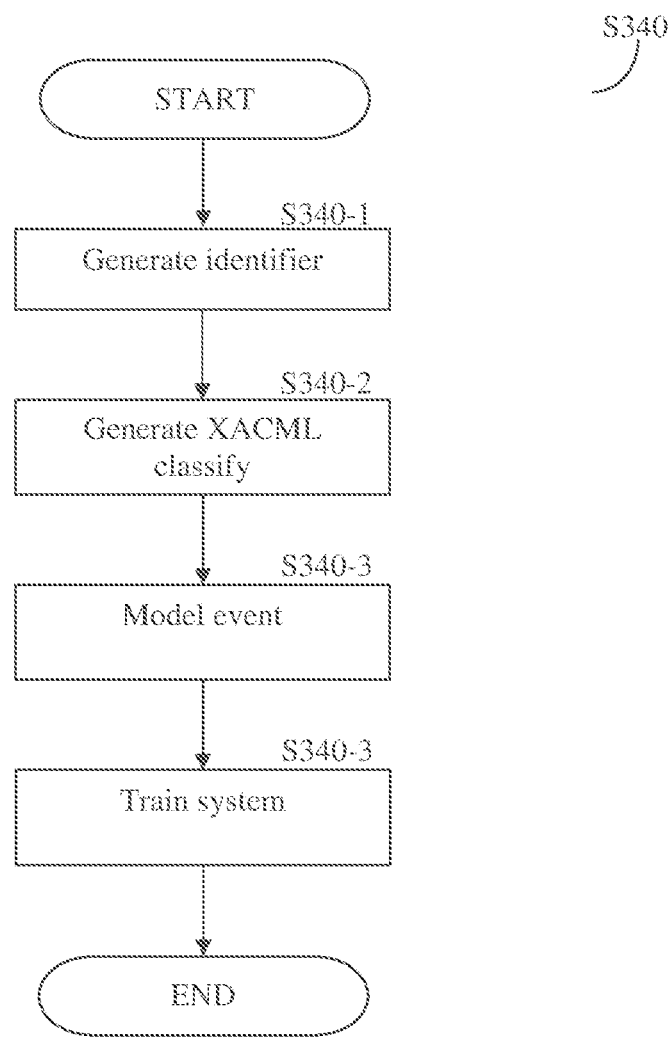
FIG. 5 is a flowchart describing the operation of matching an event's metadata to a unitary index according to an exemplary embodiment.

FIG. 5 shows an exemplary and non-limiting flowchart 340 describing the operation of matching the metadata associated with an event to a unitary index according to an embodiment. In optional S340-1, an identifier is generated corresponding to the metadata. In S340-2, the metadata is matched to the unitary index and a XACML classification is generated respective thereof. In S340-3, the event is modeled respective of the match. In S340-4, the system 100 is trained to handle similar events respective of the generated identifier and execution terminates.

The principles of the disclosed teachings can be implemented as hardware, firmware, software, or any combination thereof. Moreover, the software is preferably implemented as an application program tangibly embodied on a program storage unit or tangible computer-readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), a memory, and input/output interfaces.

The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional data storage unit and a printing unit. All or some of the servers maybe combined into one or more integrated servers.

Furthermore, a non-transitory computer-readable medium is any computer-readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method, comprising:
    identifying, by a computer, an event in a data network initiated by an entity making a request, the event having an event type;
    analyzing, by the computer, the event to identify an operation and a resource associated with the event;
    generating, by the computer based at least on the analyzing, metadata associated with the event, the metadata including:
    the type of the event;
    the entity that initiated the request associated with the event; or
    the operation and the resource associated with the event;
    matching, by the computer, the metadata to a unified index stored in a database communicatively coupled to the computer, wherein the unified index enables unified classification of events as potential security incidents in the data network and naming of objects in the event using a unitary language, the objects including the resource, wherein the unified index uses an extensible access control markup language standard, and wherein the matching further comprises matching the metadata to an extensible access control markup language classification;
    determining, by the computer based at least on the matching, whether the event comprises a potential security incident;
    obtaining, by the computer, a security policy from the database, the security policy containing an instruction on how to handle the potential security incident; and
    performing, by the computer, an action required by the security policy.

2. The method according to claim 1, wherein the naming of objects in the event comprises parsing the event to a plurality of portions, the plurality of portions including the entity that initiated the request associated with the event, the operation associated with the event, and the resource for the operation.

3. The method according to claim 1, wherein the entity comprises a device, a type of the device, a plurality of user devices, or a user.

4. The method according to claim 1, wherein the type of the event comprises a local request, a request sent to a server computer communicatively connected to the computer, a request sent to a web source over the data network, or an outgoing communication.

5. The method according to claim 1, wherein the resource associated with the event comprises a file, a document, a web page, a server to which the request was sent, or a link to the resource.

6. The method according to claim 1, wherein the computer comprises a proxy server having a processing unit and a policy enforcement point, the policy enforcement point having a set of rules executable by the processing unit, the set of rules when executed by the processing unit configures the proxy server for handling an identified potential security incident based on at least one of the set of rules.

7. The method according to claim 1, wherein the event comprises a request sent by a user device or to the user device, a file download, a file view, an attempt to connect to a network, to log on to a service, or a combination thereof.

8. A system, comprising:
    a processing unit;
    a non-transitory computer-readable medium; and
    stored instructions stored on the non-transitory computer-readable medium and translatable by the processing unit for:
    identifying an event in a data network initiated by an entity making a request, the event having an event type;
    analyzing the event to identify an operation and a resource associated with the event;
    generating, based at least on the analyzing, metadata associated with the event, the metadata including:
    the type of the event;
    the entity that initiated the request associated with the event; or
    the operation and the resource associated with the event;
    matching the metadata to a unified index stored in a database, wherein the unified index enables unified classification of events as potential security incidents in the data network and naming of objects in the event using a unitary language, the objects including the resource, wherein the unified index uses an extensible access control markup language standard, and wherein the matching further comprises matching the metadata to an extensible access control markup language classification;
    determining, based at least on the matching, whether the event comprises a potential security incident;
    obtaining a security policy from the database, the security policy containing an instruction on how to handle the potential security incident; and
    performing an action required by the security policy.

9. The system of claim 8, wherein the naming of objects in the event comprises parsing the event to a plurality of portions, the plurality of portions including the entity that initiated the request associated with the event, the operation associated with the event, and the resource for the operation.

10. The system of claim 8, wherein the entity comprises a device, a type of the device, a plurality of user devices, or a user.

11. The system of claim 8, wherein the type of the event comprises a local request, a request sent to a server computer, a request sent to a web source over the data network, or an outgoing communication.

12. The system of claim 8, wherein the resource associated with the event comprises a file, a document, a web page, a server to which the request was sent, or a link to the resource.

13. The system of claim 8, further comprising:
    a policy enforcement point having a set of rules executable by the processing unit, the set of rules when executed by the processing unit configures the system for handling an identified potential security incident based on at least one of the set of rules.

14. The system of claim 8, wherein the event comprises a request sent by a user device or to the user device, a file download, a file view, an attempt to connect to a network, to log on to a service, or a combination thereof.

15. A computer program product having a non-transitory computer-readable medium storing instructions translatable by a processing unit for:

identifying an event in a data network initiated by an entity making a request, the event having an event type;

analyzing the event to identify an operation and a resource associated with the event;

generating, based at least on the analyzing, metadata associated with the event, the metadata including: the type of the event;

the entity that initiated the request associated with the event; or the operation and the resource associated with the event;

matching the metadata to a unified index stored in a database, wherein the unified index enables unified classification of events as potential security incidents in the data network and naming of objects in the event using a unitary language, the objects including the resource, wherein the unified index uses an extensible access control markup language standard, and wherein the matching further comprises matching the metadata to an extensible access control markup language classification;

determining, based at least on the matching, whether the event comprises a potential security incident;

obtaining a security policy from the database, the security policy containing an instruction on how to handle the potential security incident; and performing an action required by the security policy.

16. The computer program product of claim 15, wherein the naming of objects in the event comprises parsing the event to a plurality of portions, the plurality of portions including the entity that initiated the request associated with the event, the operation associated with the event, and the resource for the operation.

17. The computer program product of claim 15, wherein the entity comprises a device, a type of the device, a plurality of user devices, or a user.

18. The computer program product of claim 15, wherein the type of the event comprises a local request, a request sent to a server computer, a request sent to a web source over the data network, or an outgoing communication.

19. The computer program product of claim 15, wherein the resource associated with the event comprises a file, a document, a web page, a server to which the request was sent, or a link to the resource.

20. The computer program product of claim 15, wherein the event comprises a request sent by a user device or to the user device, a file download, a file view, an attempt to connect to a network, to log on to a service, or a combination thereof.

\* \* \* \* \*